United States Patent
Li et al.

(10) Patent No.: US 11,973,791 B1
(45) Date of Patent: Apr. 30, 2024

(54) DETECTING NETWORK ENTITIES THAT POSE A CYBERSECURITY RISK TO A PRIVATE COMPUTER NETWORK

(71) Applicant: Trend Micro Incorporated, Tokyo (JP)

(72) Inventors: Zhijie Li, Nanjing (CN); ZhengBao Zhang, Nanjing (CN); Lili Diao, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 353 days.

(21) Appl. No.: 17/493,494

(22) Filed: Oct. 4, 2021

(51) Int. Cl.
*H04L 9/40* (2022.01)
*G06N 5/02* (2023.01)

(52) U.S. Cl.
CPC .......... *H04L 63/1433* (2013.01); *G06N 5/02* (2013.01); *H04L 63/1483* (2013.01)

(58) Field of Classification Search
CPC ............. H04L 63/1433; H04L 63/1483; H04L 63/1416; H04L 63/1425; H04L 63/1466; H04L 63/20
USPC ........................................ 726/25, 22, 23, 24
See application file for complete search history.

(56) References Cited

U.S. PATENT DOCUMENTS

| | | | |
|---|---|---|---|
| 10,044,745 B1* | 8/2018 | Jones | G06F 21/55 |
| 2019/0379678 A1* | 12/2019 | McLean | G06F 16/285 |
| 2021/0152567 A1* | 5/2021 | Huston, III | H04L 67/306 |
| 2022/0191230 A1* | 6/2022 | Morgan | H04L 63/1425 |

OTHER PUBLICATIONS

Wikipedia—Secure Access Service Edge, 7 sheets [retrieved on Sep. 29, 2021], retrieved from the internet: https://en.wikipedia.org/wiki/Secure_Access_Service_Edge.
Security Operations Teams Get Relief From Alert Overload with the Trend Micro Vision One Platform—News provided by Trend Micro Incorporated, Feb. 9, 2021, 3 sheets.
Symantec Risk Insight—Being better prepared means better protected Data Sheet, Apr. 2016, 2 sheets.

* cited by examiner

*Primary Examiner* — Teshome Hailu
(74) *Attorney, Agent, or Firm* — Beyer Law Group LLP

(57) ABSTRACT

A risk knowledge graph is created from information on risk events involving network entities of a private computer network. Each of the risk events is represented as a node in the risk knowledge graph. The nodes are connected by edges that represent the risk events. The nodes are grouped into communities of related nodes. A response action is performed against a community to mitigate a cybersecurity risk posed by the community.

20 Claims, 10 Drawing Sheets

DETECTING NETWORK ENTITIES THAT POSE A CYBERSECURITY RISK TO A PRIVATE COMPUTER NETWORK

TECHNICAL FIELD

The present invention is generally directed to cybersecurity and computer networks.

BACKGROUND

Secure Access Service Edge (SASE) is a cloud-delivered service that combines network and security functions with Wide Area Network (WAN) capabilities to support the dynamic, secure access needs of today's hybrid organizations. Conceptually, SASE extends networking and security capabilities beyond where they are typically available. This allows users of an organization, regardless of their physical location, to take advantage of firewall as a service (FWaaS), secure web gateway (SWG), zero-trust network access (ZTNA), and a medley of threat detection functions.

A SASE service may include a risk insight system that indicates an organization's vulnerability to phishing, ransomware, Business Email Compromise (BEC), Advanced Persistent Threat (APT), password spray, denial of service, unauthorized intrusion, malware infection, spam, and other cyberattacks. The risk insight system collects activity, status, and detection information from a variety of cybersecurity sensors deployed at endpoints, such as a Cloud Access Security Broker (CASB), Secure Web Gateway (SWG), etc. The risk insight system employs expert rules, machine learning algorithms, and other risk analysis algorithms to assess risks associated with the collected information to detect risk events. The risk insight system may use risk scoring to present a risk level for the entire organization and for individual network entities of the organization (e.g., users, devices, applications, services and related attributes). Based on the risk score and detected risk events, SASE enforces adaptive access control and risk control (mitigation, transfer, avoidance, acceptance).

FIG. 1 shows a user interface 150 of a conventional SASE service, which in this example is provided by Trend Micro, Incorporated. The user interface 150 displays a risk score of an entire organization (see arrow 151), which in the example of FIG. 1 is "49", indicating a medium risk-level in a risk scoring of 1 to 100, where 1 indicates lowest risk and 100 indicates highest risk. Generally speaking, a risk insight system of a SASE service may determine an overall risk score for the entire organization based on individual detected risk events (e.g., see arrow 153) involving network entities (e.g., see arrow 152) of the organization. A risk score may also be determined for individual network entities and risk events. A risk score is indicative of vulnerability to a cyberattack and severity of the cyberattack.

BRIEF SUMMARY

In one embodiment, a method of detecting risk communities in a private computer network includes receiving information on risk events involving network entities of a private computer network, each of the risk events posing a cybersecurity risk to the private computer network, the network entities including users of the private computer network. Each network entity is represented as a node of a risk knowledge graph. The nodes are connected with edges, with each edge representing one or more risk events involving nodes connected by the edge. The nodes are grouped into communities, with each community including nodes that are more related to each other relative to other nodes included in other communities. A response action is performed on a community to mitigate a cybersecurity risk posed by the community to the private computer network.

In another embodiment, a computer system includes at least one processor and a memory, the memory storing instructions that when executed by the at least one processor cause the computer system to: (a) receive information on a plurality of risk events involving a plurality of network entities of a private computer network, each of the plurality of risk events posing a cybersecurity risk to the private computer network, the plurality of network entities including users of the private computer network; (b) represent each network entity of the plurality of network entities as a node of a risk knowledge graph; (c) connect a plurality of nodes of the risk knowledge graph with edges, with each edge representing a risk event of the plurality of risk events involving nodes connected by the edge; (d) group the plurality of nodes into a plurality of communities, with each community of the plurality of communities including nodes that are more related to each other relative to other nodes included in other communities; and (e) perform a response action on a particular community of the plurality of communities to mitigate a cybersecurity risk posed by the particular community to the private computer network.

In yet another embodiment, a method of detecting network entities that pose a cybersecurity risk to a private computer network includes receiving information on risk events involving network entities of the private computer network, the network entities including users of the private computer network. Each network entity is represented as a node of a risk knowledge graph. The nodes of the risk knowledge graph are connected with edges, with each edge representing a risk event involving nodes connected by the edge. The nodes are displayed with colors the are indicative of risk scores of the nodes.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
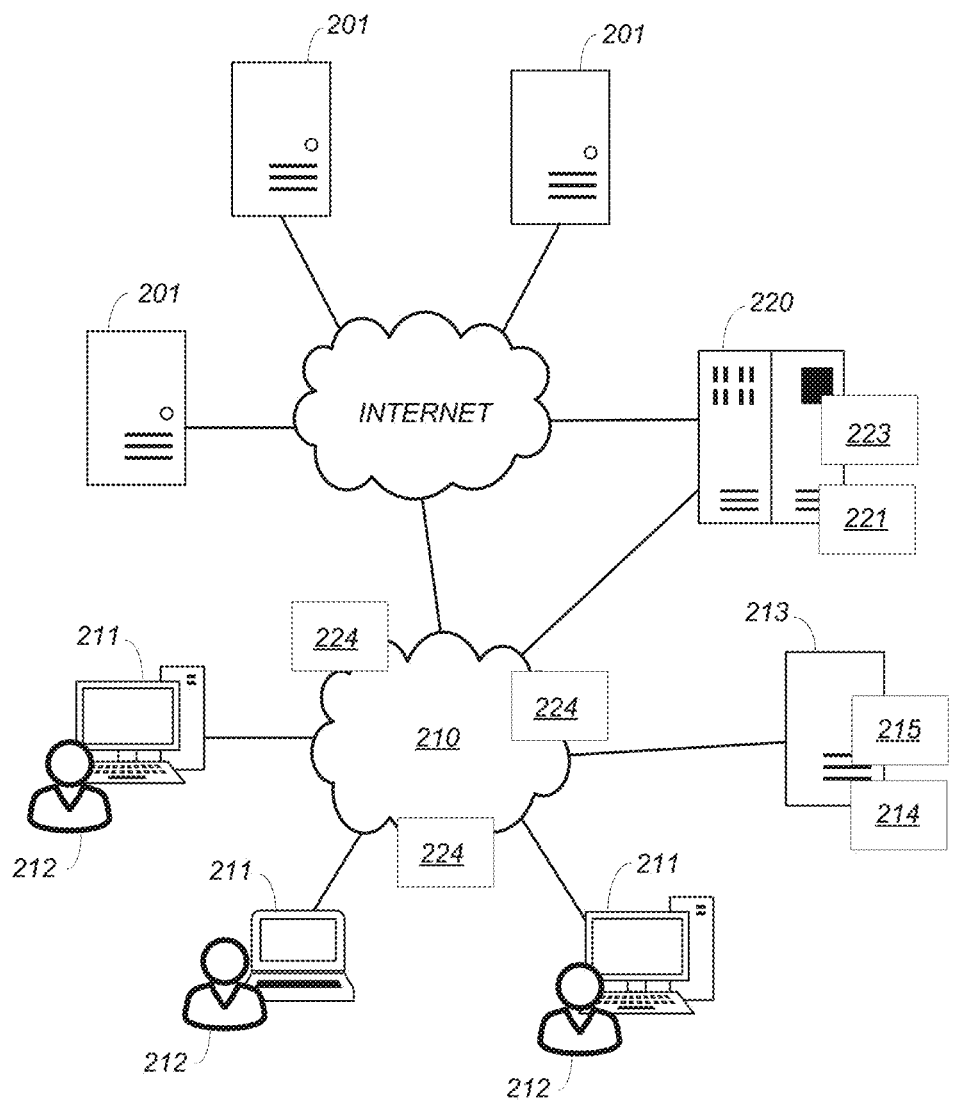
FIG. 2 shows a logical diagram of a private computer network in accordance with an embodiment of the present invention.

FIG. 2 shows a logical diagram of a private computer network 210 in accordance with an embodiment of the present invention. The private computer network 210 is that of an organization, such as a private company, government, educational institution, etc. The private computer network 210 has a plurality of users 212 that employ corresponding computers 211. A computer 211 may be a desktop computer, laptop computer, server computer, or other computing device. The private computer network 210 may further include other computers, such as one or more server computers 213 that provide a service 214 or run an application software 215. In one embodiment, the computers of the private computer network 210 communicate over a Software-Defined Wide Area Network (SD-WAN). As can be appreciated, embodiments of the present invention are equally applicable to other networking architectures.

In the example of FIG. 2, the private computer network 210 is subscribed to a SASE service provided by a backend system 220. The backend system 220 may comprise one or more computers for providing a SASE service in-the-cloud, which in the example of FIG. 2 is over the Internet and the private computer network 210. The backend system 220 may be implemented on an Infrastructure as a Service (IaaS) platform, such as the Amazon™ Web Services (AWS) platform or Microsoft™ Azure platform, for example. The backend system 220 may include a plurality of cybersecurity sensors 224 for collecting information on risk events involving network entities of the private computer network 210. The collected information may indicate the users, devices, services, application software, Internet Protocol (IP) address, host names, and other information involved in the risk events. The sensors 224 may be deployed at various endpoints including Cloud Access Security Brokers (CASBs), Secure Web Gateway (SWG), software-defined (SD) routers, etc. The backend system 220 may include one or more risk analysis engines 223 that implement expert rules, machine learning algorithms, and/or other algorithms for detecting and assessing risk events based on information collected by the sensors 224. The backend system 220 may implement a conventional SASE service that is augmented with a risk detector 221. For example, the risk detector 221 may be incorporated in the SASE service provided by Trend Micro Incorporated to facilitate detection of network entities and/or communities of network entities that pose a cybersecurity risk to private computer networks that are subscribed to the SASE service. As can be appreciated, embodiments of the present invention may also be incorporated in other commercially-available SASE services.

The risk detector 221 may comprise instructions stored in a main memory of the backend system 220 that when executed by at least one processor of the backend system 220 cause the backend system 220 to receive information on risk events involving network entities of the private computer network 210, generate a risk knowledge graph that indicates relationships among the network entities involved in the risk events, and detect risk communities of network entities from the risk knowledge graph. A risk community is a group of network entities that pose a cybersecurity risk to the private computer network 210. The operation of the risk detector 221 is further explained below.

For purposes of the present disclosure, a "network entity" is a user, device, application software, or service of a private computer network. A user may be identified by a user identifier, such as a username or domain account in an active directory. A network entity may have a corresponding attribute that is related to the network entity, such as IP address or host name. An attribute does not have to be part of the private computer network, such as an IP address or host name of an external device. For example, a user ("network entity") of the private computer network may have a related host name ("attribute"), which is that of an external website that the user visited using a web browser. In the present disclosure, a "network entity" of the private computer network refers to a network entity and/or attribute related to the network entity.

A risk event is an event that poses a cybersecurity risk to the private computer 210, such as password spray, phishing, credential leak, unauthorized intrusion, access to malicious websites, clicking on malicious links, etc. Individual risk events may be detected by the backend system 220 from information collected by the sensors 224. An example risk event is an occurrence of a user clicking (e.g., using a mouse) on a malicious link that points to a malicious computer 201 on the Internet. Another example risk event is detection of a credential leak of a user 212, such as a login password (or other credential) of the user 212 appearing on a malicious website hosted by a computer 201 on the Internet. Yet another example risk event is occurrence of attempts to guess the password of several users 212 one by one. Still another example risk event is phishing emails being sent to users 212.

Figure 3:
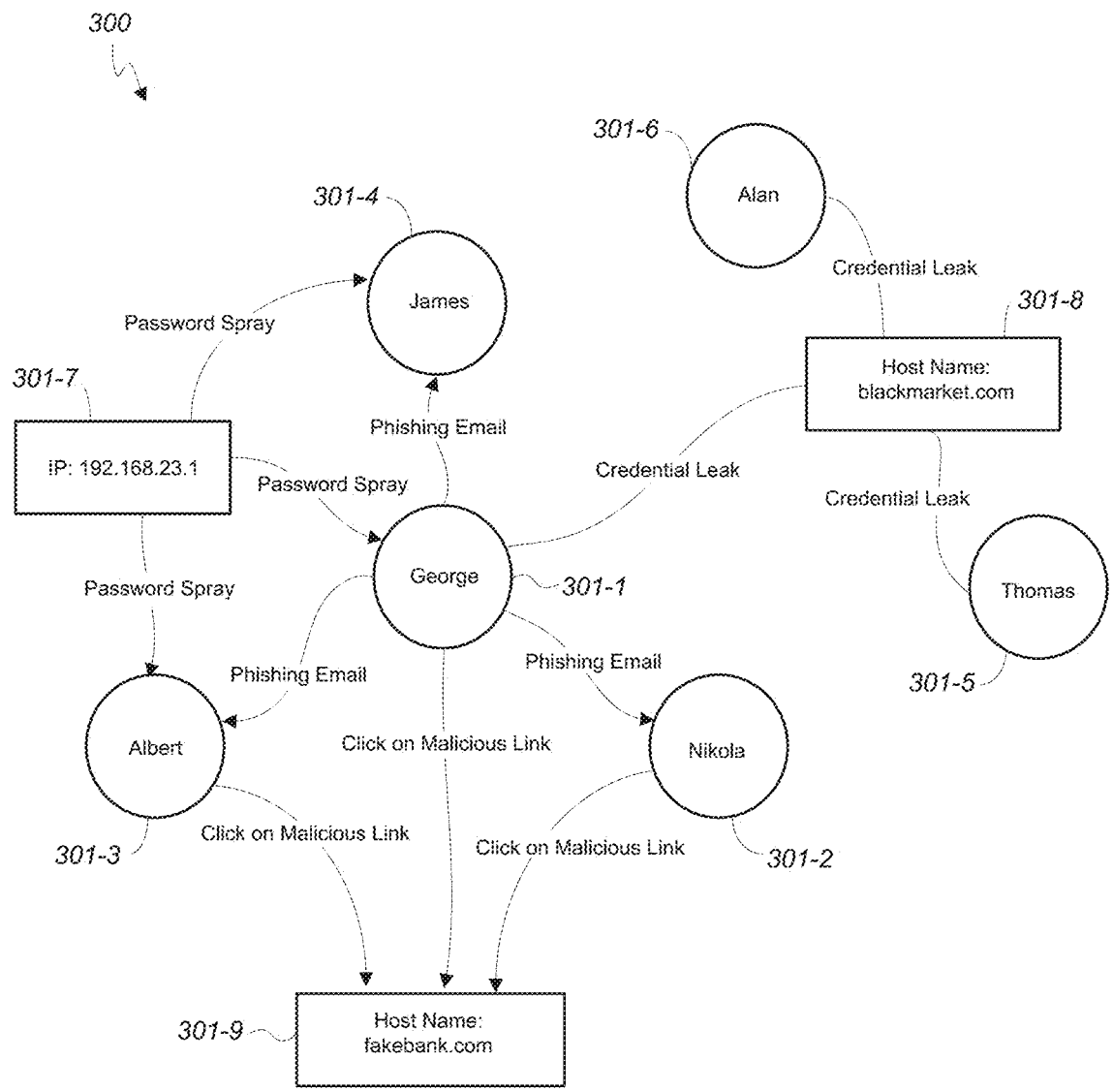
FIG. 3 shows an example risk knowledge graph of a private computer network in accordance with an embodiment of the present invention.

FIG. 3 shows an example risk knowledge graph 300 of the private computer network 210 in accordance with an embodiment of the present invention. The risk knowledge graph 300 may be generated by the risk detector 221. The risk knowledge graph 300 includes a plurality of nodes 301 (i.e., 301-1, 301-2, 301-3, etc.), with each node 301 representing a network entity of the private computer network 210. In the example of FIG. 3, the network entities include users (see nodes 301-1, 301-2, 301-3, 301-4, 301-5, and 301-6) of the private computer network 210 and attributes that are related to the users (see nodes 301-7, 301-8, and 301-9). It is to be noted that a node 301 may also represent other types of network entities, such as devices, services, application software, etc. of the private computer network 210 and their related attributes. Devices, services, and application software of the private computer network 210 may be identified by their internally-recognized IP address, Media Access Control (MAC) address, Uniform Resource Identifier (URI), etc. Also, FIG. 3 shows a small portion of a much bigger risk knowledge graph; in practice, the risk knowledge graph 300 will have a lot more nodes 301 to represent the large number of network entities of a typical private computer network.

In the risk knowledge graph 300, the nodes are connected by edges, with each edge representing one or more risk events involving the nodes connected by the edge. For example, the nodes 301-1 and 301-7 are connected by an edge that represents a "Password Spray" risk event. A password spray is a cyberattack wherein a computer attempts to guess the password of several users one by one. In the risk knowledge graph 300, the user "George" (see node 301-1) is the target of a password spray (see edge connecting nodes 301-1 and 301-7) by a computer that is identified by its malicious IP address (see node 301-7). In that example, the malicious IP address is related to George by the risk event represented by the edge connecting the nodes that represent the malicious IP address and George. Information about individual risk events, individual network entities that are involved in the risk events, and risk scores of individual risk events and network entities may be obtained or determined by the backend system 220 as part of its conventional SASE service. A risk score is indicative of vulnerability to a cyberattack and severity of the cyberattack.

In the example of FIG. 3, the users George (see node 301-1), Albert (see node 301-3), and James (see node 301-4) are the target of the password spray attack perpetrated by the computer (operated by a cybercriminal) having the malicious IP address "192.168.23.1" represented by the node 301-7. George has also been detected to send phishing emails to Albert, James, and Nikola (see node 301-2). Accordingly, each of the nodes representing Albert, James, and Nikola is connected to the node representing George by an edge that represents the phishing email risk event. George, Albert, and Nikola have also been detected to click on a malicious link (e.g., on a web page of a malicious website) with a malicious host name represented by a node 301-9. Therefore, each of the nodes representing George, Albert, and Nikola is connected to the node representing the malicious host name by an edge that represents the click on malicious link risk event. Outside the private computer network 210, the credentials of George, Alan (see node 301-6), and Thomas (see node 301-5) have been detected on a malicious website with a malicious host name represented by a node 301-8. Accordingly, each of the nodes representing George, Alan, and Thomas is connected to the node representing the malicious host name by an edge that represents the credential leak risk event. It is to be noted that two nodes 301 may be connected by an edge that represents one or more risk events, with each of the one or more risk events involving the two nodes 301.

Each edge of the risk knowledge graph 300 may be assigned a weight, which is also referred to herein as an "edge weight." The edge weight of an edge may be calculated from the risk scores of one or more risk events represented by the edge using the following weighted score function, $$\text{edge weight} = \frac{\sum_{i=0}^{n} r_i^2}{\sum_{i=0}^{n} r_i}$$

where $r_i$ is a risk score for each risk event. The higher the risk score for an individual risk event, the higher the resulting edge weight score. A response action may be performed against a high-risk network entity to mitigate a cybersecurity threat posed by the high-risk network entity. The high-risk network entity may be a network entity that is connected to another network entity by an edge with an edge weight that is greater than a threshold edge weight. The response action may include treating the detection of the high-risk network entity as a new risk event, increasing the risk score of the high-risk network entity, putting the high-risk network entity in quarantine, raising an alert regarding the high-risk network entity, informing the network administrator about the high-risk network entity etc.

The risk knowledge graph provides advantages heretofore unrealized. First, by providing a structural overview of risks in an organization, the risk knowledge graph provides more insight to the relationships between network entities, thus allowing for identification of high-risk network entities and other network entities that may be affected by them. The risk knowledge not only provides risk evaluation of the network entities but also the connection and impact between them. In other words, the risk knowledge graph allows for identification of network entities that may cause risk propagation. Using FIG. 3 as an example, with information only on individual network entities or risk events, it would be very difficult to detect that any user that has some connection to George is at-risk, because George is involved in several risk events.

Second, the risk knowledge graph allows for identification of risk communities. More particularly, network entities that together pose a high risk to the private computer network may be identified from the risk knowledge graph. In one embodiment, risk communities on a risk knowledge graph are identified using the Louvain method. Briefly, the Louvain method is an algorithm to detect communities in large networks. The Louvain method maximizes a modularity score, where the modularity quantifies the quality of an assignment of nodes to communities.

Figure 4:
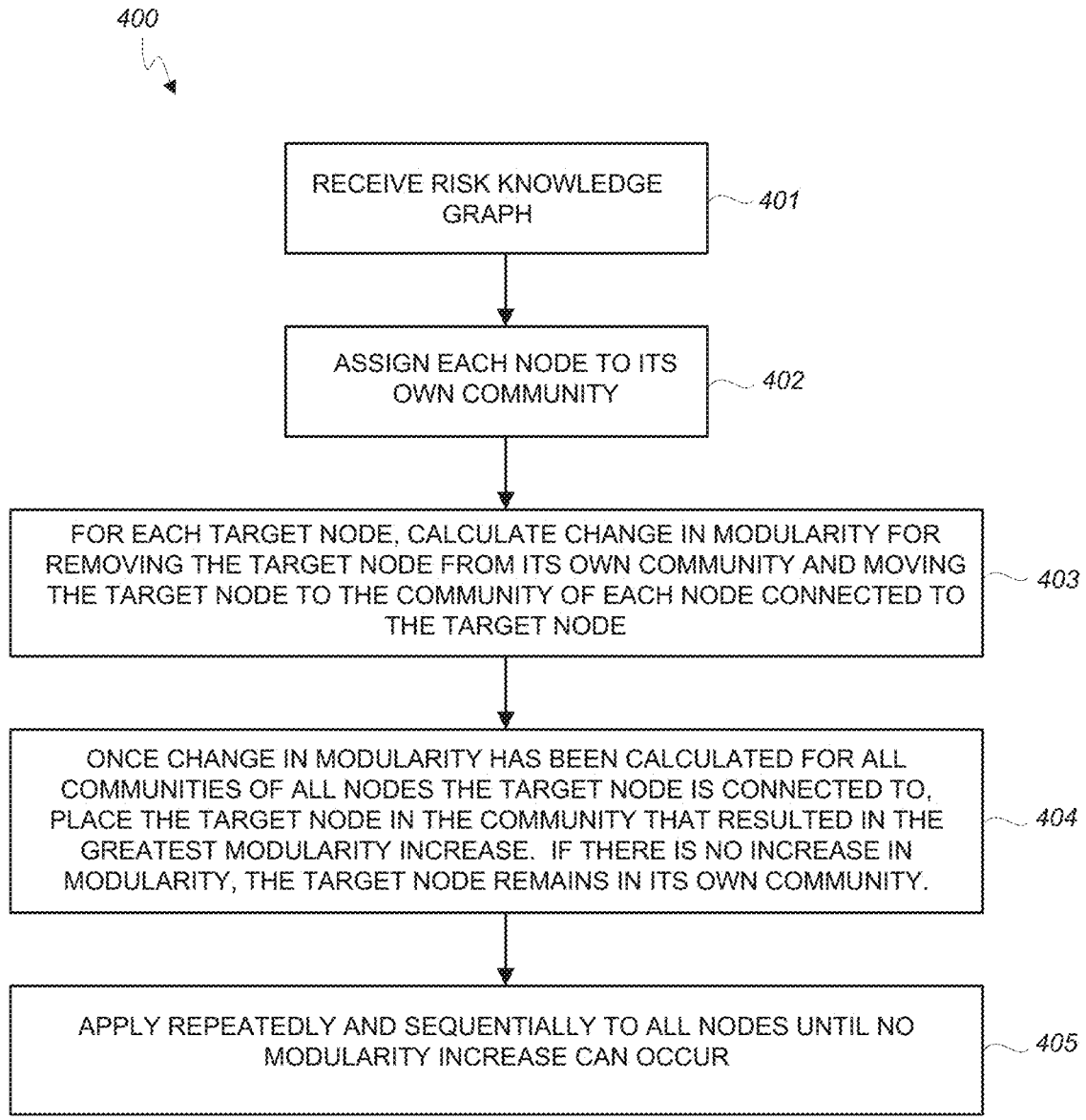
FIG. 4 shows a flow diagram of a method of grouping nodes of a risk knowledge graph into risk communities in accordance with an embodiment of the present invention.

FIG. 4 shows a flow diagram of a method 400 of grouping nodes of a risk knowledge graph into risk communities in accordance with an embodiment of the present invention. The method 400 applies the Louvain method to a risk knowledge graph to identify risk communities in the risk knowledge graph. The method 400 may be performed by the risk detector 221.

A risk community is also simply referred to herein as a "community." The method 400 begins by receiving a risk knowledge graph (step 401). Each node of the risk knowledge graph is assigned to its own community (step 402). For each node in the risk knowledge graph, a change in modularity of the risk knowledge graph is calculated for when the node is removed from its own community and moved to the community of each of its neighboring nodes (step 403). Once the change in modularity score is calculated for communities of all of its neighboring nodes, the node is placed in the community that resulted in the greatest modularity increase; if there is no increase in the modularity, the node remains in its own community (step 404). The above calculation of change in modularity (i.e., steps 403 and 404) is repeatedly and sequentially applied until no modularity increase can occur (step 405). Each of the resulting community has member nodes that are more related to one another relative to other nodes of other communities.

Figure 5:
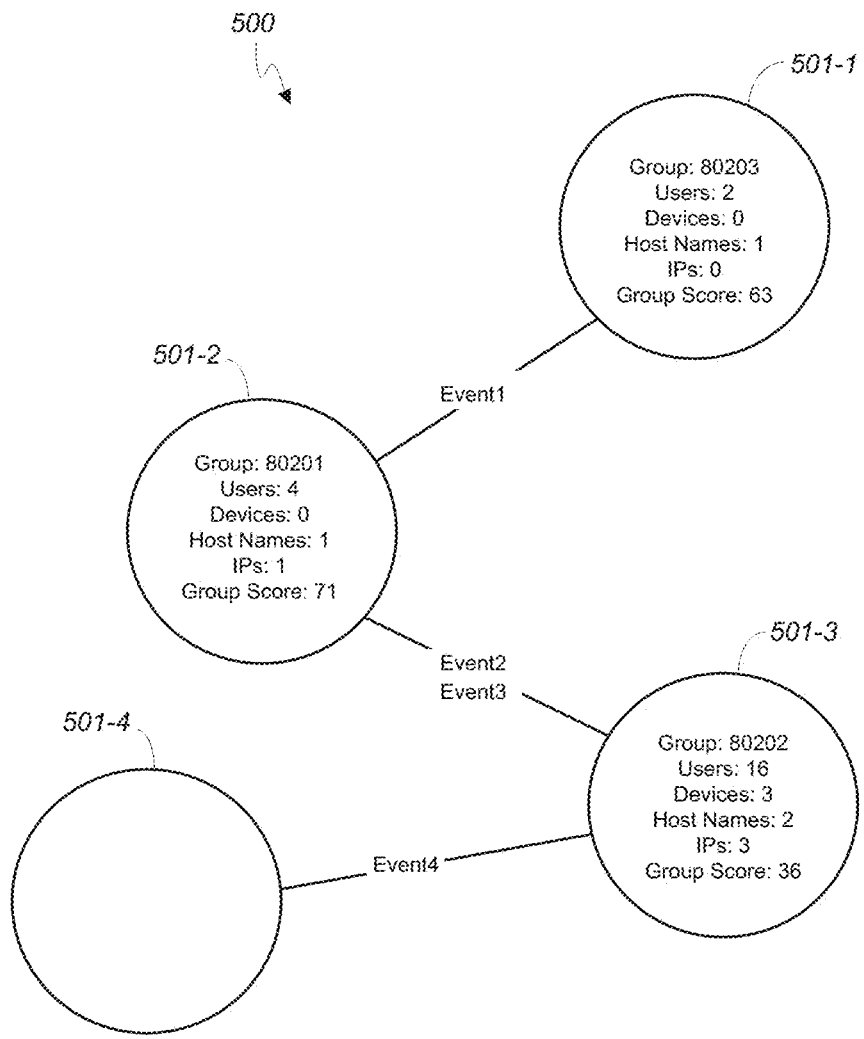
FIG. 5 shows a risk community graph in accordance with an embodiment of the present invention.
Figure 6:
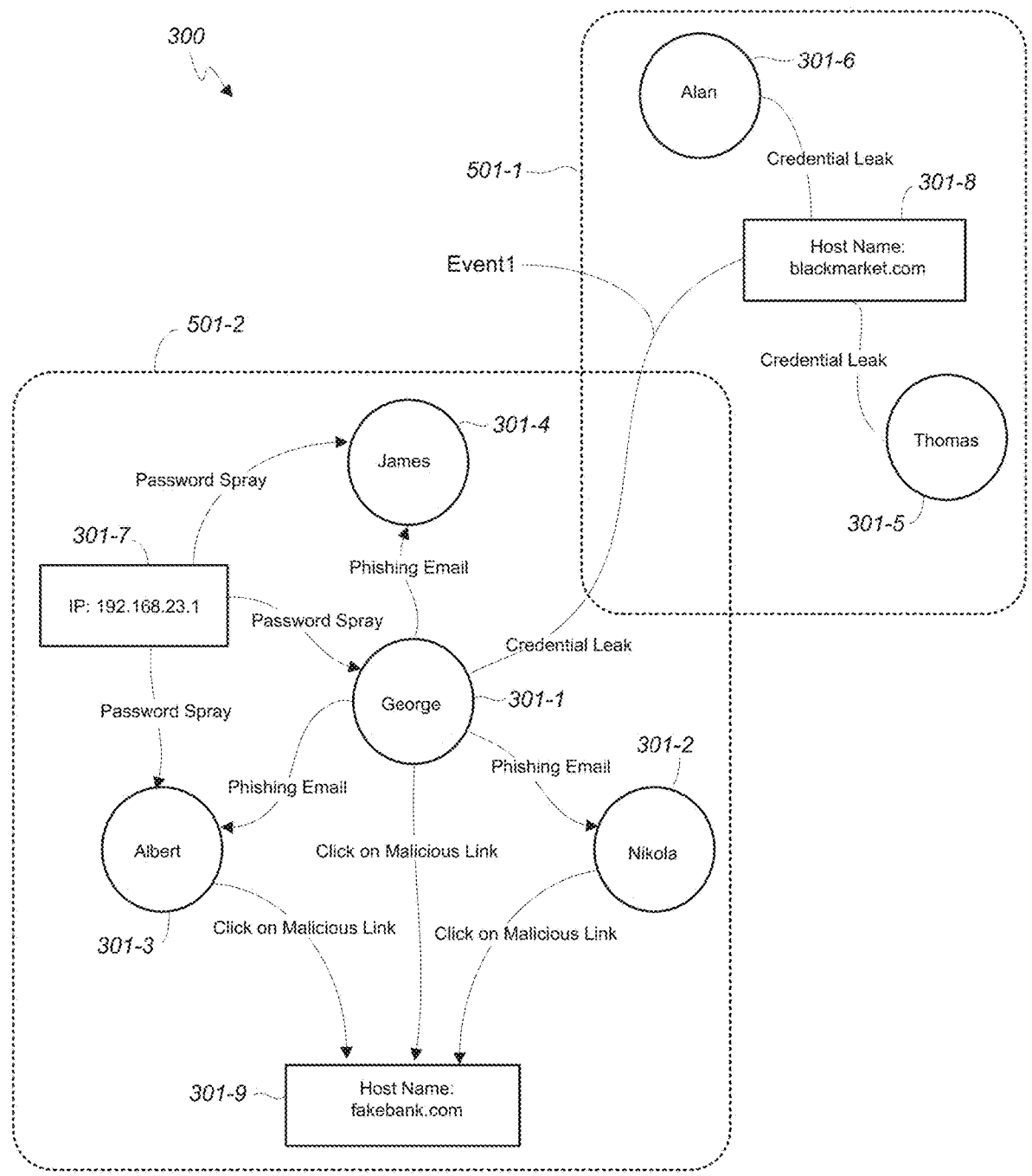
FIG. 6 shows the risk knowledge graph of FIG. 3 with annotations to show the nodes included in risk communities of the risk community graph of FIG. 5.

FIG. 5 shows a risk community graph 500 in accordance with an embodiment of the present invention. The risk community graph 500 may be generated by the risk detector 221 by applying the Louvain method to the risk knowledge graph 300. FIG. 6 shows the risk knowledge graph 300 with annotations to show the nodes included in risk communities of the risk community graph 500.

Referring to FIG. 5, the risk community graph 500 includes a plurality of communities 501 (i.e., 501-1, 501-2, 501-3, 501-4, . . . ), with each community 501 comprising one or more nodes of the risk knowledge graph 300. In the example of FIG. 5, each community 501 has an associated group number for identification purposes, has a group risk score, and indicates the number of network entities in the community. The group risk score is the total risk score of the community and may be calculated based on individual risk scores of nodes of the community. In the risk community graph 500, two communities 501 are connected by an edge that represents one or more risk events involving nodes in the two communities 501.

For example, the community 501-1 is assigned group number "80203", includes 2 users, includes zero device, includes 1 host name, includes zero IP address, and has a group risk score of 63. As illustrated in FIG. 6, the community 501-1 reflects the grouping of the nodes 301-5, 301-6, and 301-8 as a community that has 2 users (Alan and Thomas) and 1 host name ("blackmarket.com"). Similarly, referring to FIG. 5, the community 501-2 is assigned group number "80201", includes 4 users, includes zero devices, includes 1 host name, includes 1 IP address, and has a group risk score of 71. As illustrated in FIG. 6, the community 501-2 reflects the grouping of the nodes 301-1, 301-2, 301-3, 301-4, 301-7, and 301-9 as a community that has 4 users (George, Nikola, Albert, and James), 1 host name ("fakebank.com"), and 1 IP address ("192.168.23.1"). As shown in FIG. 5, the communities 501-1 and 501-2 are connected by an edge that represents "Event1", which is a "Credential Leak" risk event in the risk knowledge graph 300 (see FIG. 6, "Event1"). That is, "Event1" of the edge connecting the communities 501-1 and 501-2 represents the "Credential Leak" event involving the user George in the community 501-2 and the malicious host name "blackmarket.com" in the community 501-1.

As can be appreciated, the number of communities of a risk community graph depends on the number of nodes of the corresponding risk knowledge graph. In the example of FIG. 5, each of the communities 501-3 and 501-4 is a grouping of other nodes that are not specifically shown in the risk knowledge graph 300. "Event2" and "Event3" are risk events involving nodes of the community 501-2 and community 501-3. Similarly, "Event4" is a risk event involving nodes of the community 501-3 and community 501-4.

A risk community graph provides a structural view of risk aggregation in the organization. More particularly, the network entities that belong to the same community have more risk influence with each other. Response actions can thus be taken on the entire community, instead of individual network entities, to ensure that no high-risk network entity is missed. By discovering communities from the risk knowledge graph, the network administrator (or other information security officer) can focus his or her attention on certain communities. By tracking changes to the risk knowledge graph and/or risk community graph, the network administrator gains improved cybersecurity situation awareness and early warning.

A risk knowledge graph and a risk community graph may be represented as data that is stored in main memory or data storage device for processing. A risk knowledge graph and a risk community graph may also be represented as data that is visually displayed on a display screen as now explained with reference to FIGS. 7 and 8.

Figure 1:
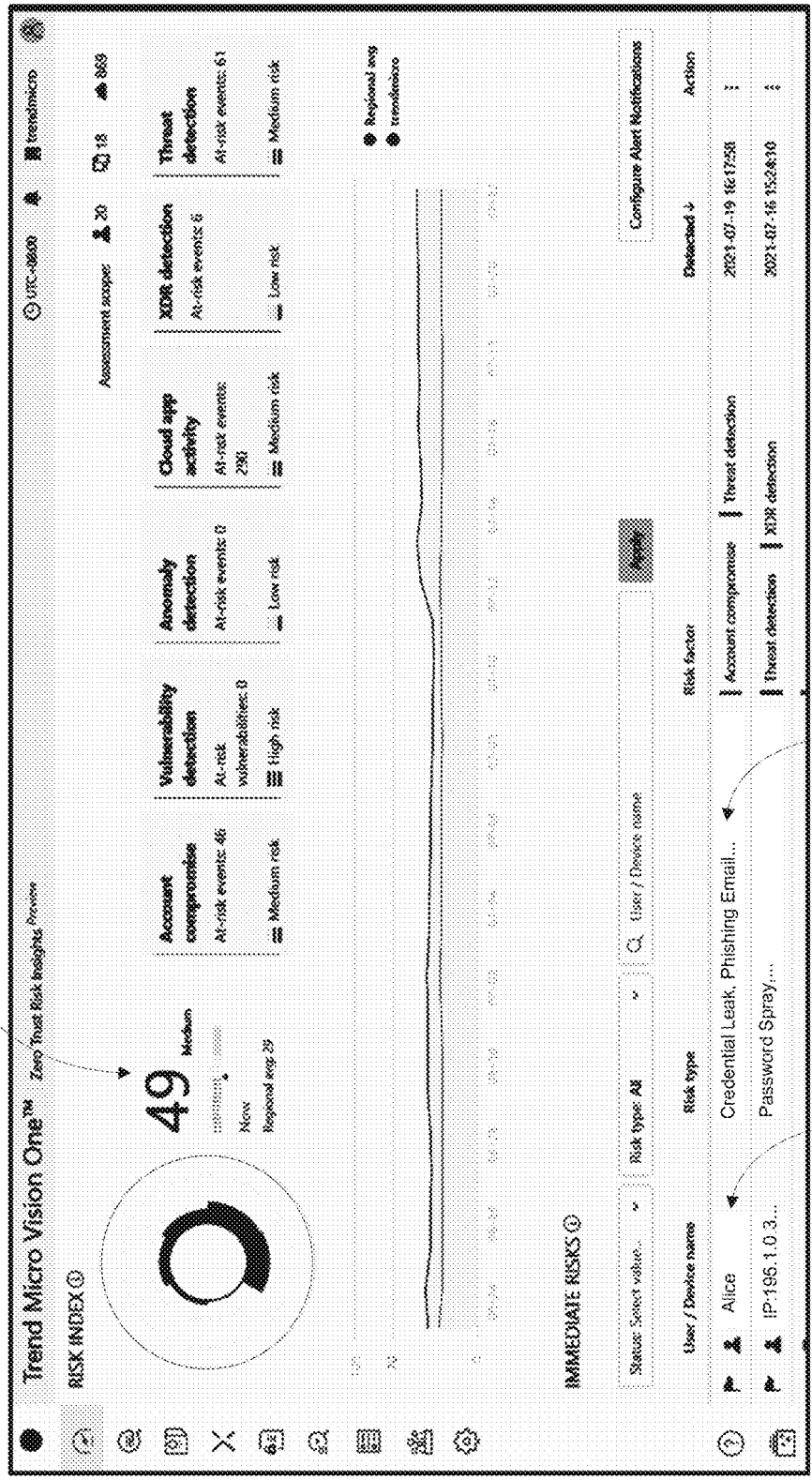
FIG. 1 shows a user interface of a conventional SASE service.
Figure 7:
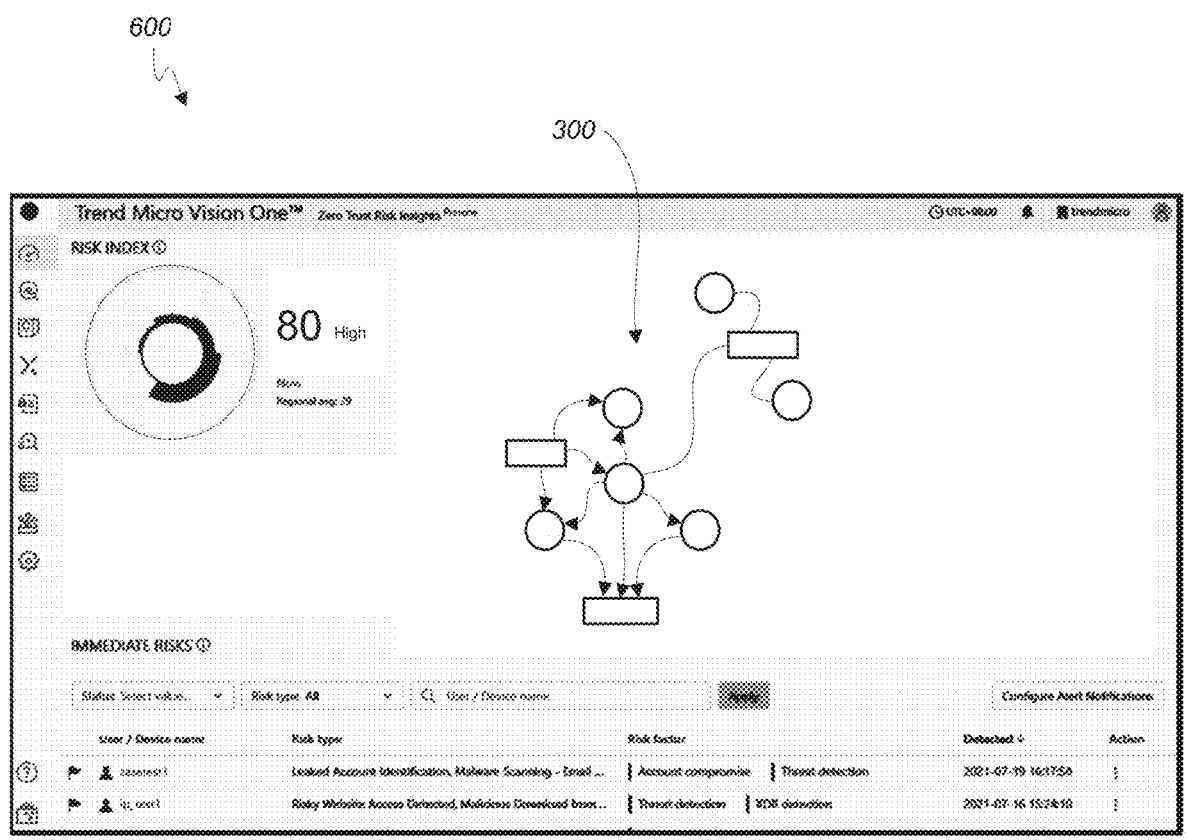
FIGS. 7 and 8 show user interfaces in accordance with embodiments of the present invention.

FIG. 7 shows a user interface 600 in accordance with an embodiment of the present invention. The user interface 600 may be generated as part of a SASE service provided by the backend system 220 (see FIG. 2, 220). The user interface 600 may be the same as the user interface 150 of FIG. 1, with the addition of the risk knowledge graph 300 displayed as part of the user interface. Each node of the risk knowledge graph 300 may have different colors to indicate the risk score of the node. For example, a node may be displayed with a green color when its risk score is 1 to 30 (low risk), an orange color when its risk score is 31 to 69 (medium risk), and a red color when its risk score is 70 to 100 (high risk). The color of a node may have graduated saturation and/or intensity for more granularity in representing the node's risk score.

Figure 8:
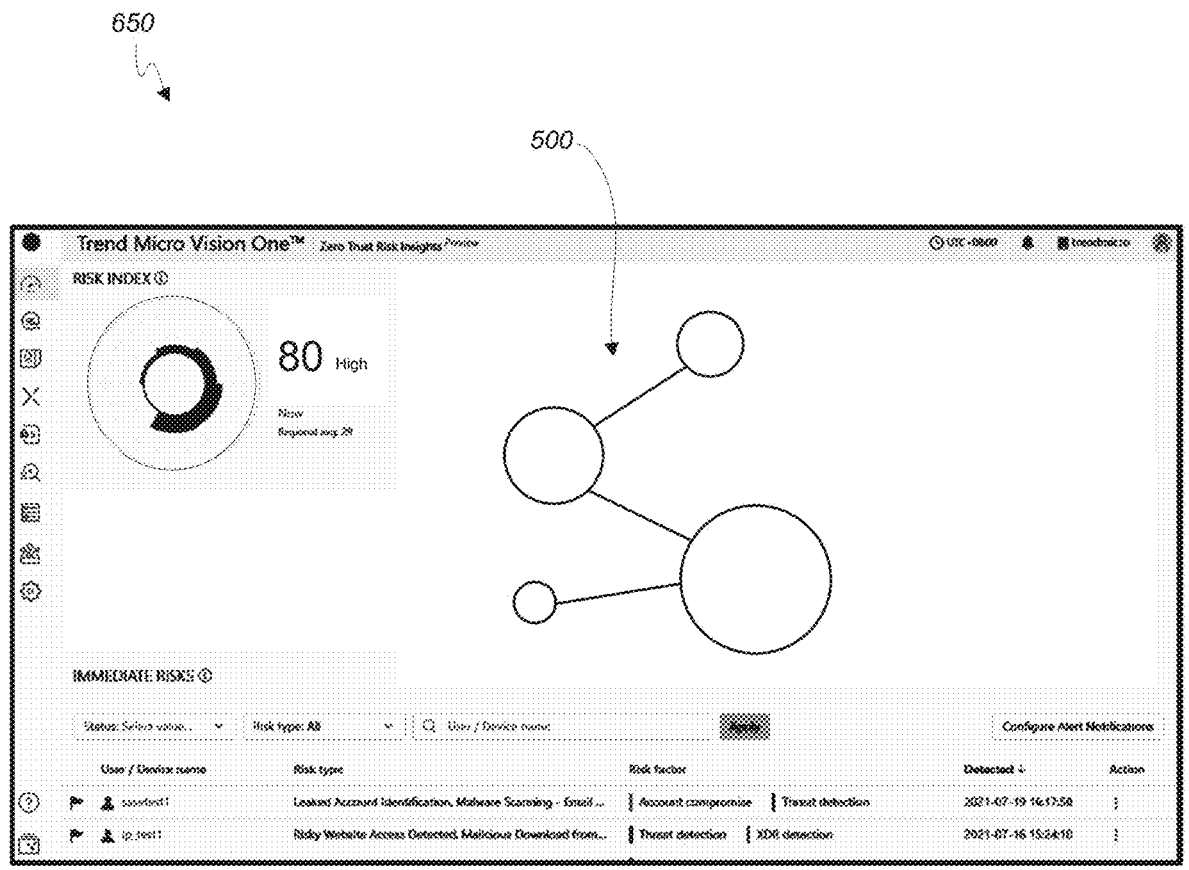

FIG. 8 shows a user interface 650 in accordance with an embodiment of the present invention. The user interface 650 is the same as the user interface 600 of FIG. 7 except for displaying the risk community graph 500 instead of the risk knowledge graph 300. Displaying the risk community graph 500 and/or the risk knowledge graph 300 may be provided as a menu option on the user interface 650. In one embodiment, a user interface displays the risk community graph 500 as in FIG. 8 upon initial login of the network administrator. Clicking on a community on the risk community graph 500 results in the risk knowledge graph 300 of the community to be displayed as in FIG. 7. As before, each community in the risk community graph 500 may be displayed with a color that is indicative of the risk posed by the community, e.g., green, orange, and red to represent low-risk, medium-risk, and high-risk communities, respectively.

Figure 9:
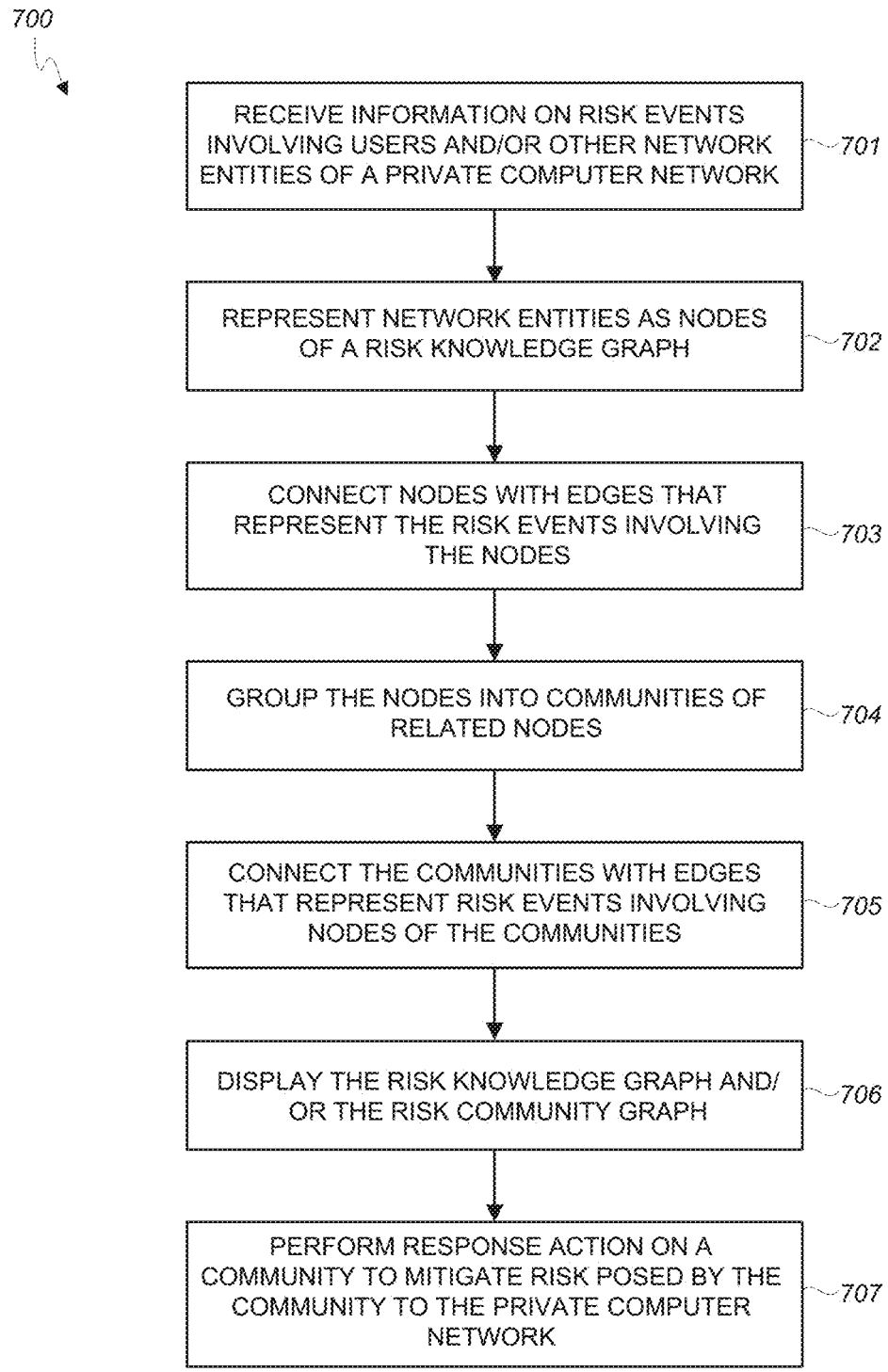
FIG. 9 shows a flow diagram of a method of identifying risk communities in a private computer network in accordance with an embodiment of the present invention.

FIG. 9 shows a flow diagram of a method 700 of detecting risk communities in a private computer network in accordance with an embodiment of the present invention. The method 700 may be performed by the risk detector 221 of the backend system 220. As can be appreciated, other components may also be employed without detracting from the merits of the present invention.

In the method 700, information on risk events involving users and/or other network entities of the private computer network is received (step 701). Each network entity is represented by a node of a risk knowledge graph (step 702). In the risk knowledge graph, two nodes are connected by an edge that represents the risk event involving the two nodes (step 703). The nodes are grouped into communities of a risk community graph (step 704), with each community including nodes that are more related to one another relative to other nodes included in other communities. Two communities in the risk community graph are connected by an edge that represents a risk event involving nodes included in the two communities (step 705). The risk knowledge graph and/or risk community graph may be displayed on a user interface of a cybersecurity service provided to the private computer network (step 706). A response action may be performed against a high-risk community identified from the risk community graph to mitigate a cybersecurity risk posed by the high-risk community (step 707). A high-risk community may be a community in the risk community graph that has a group risk score greater than a predetermined threshold. The response action may include treating the detection of the high-risk community as a new risk event, increasing the weights assigned to network entities of the high-risk community, putting the network entities of the high-risk community in quarantine, raising an alert regarding the high-risk community and its network entities, informing the network administrator about the high-risk community, etc.

Figure 10:
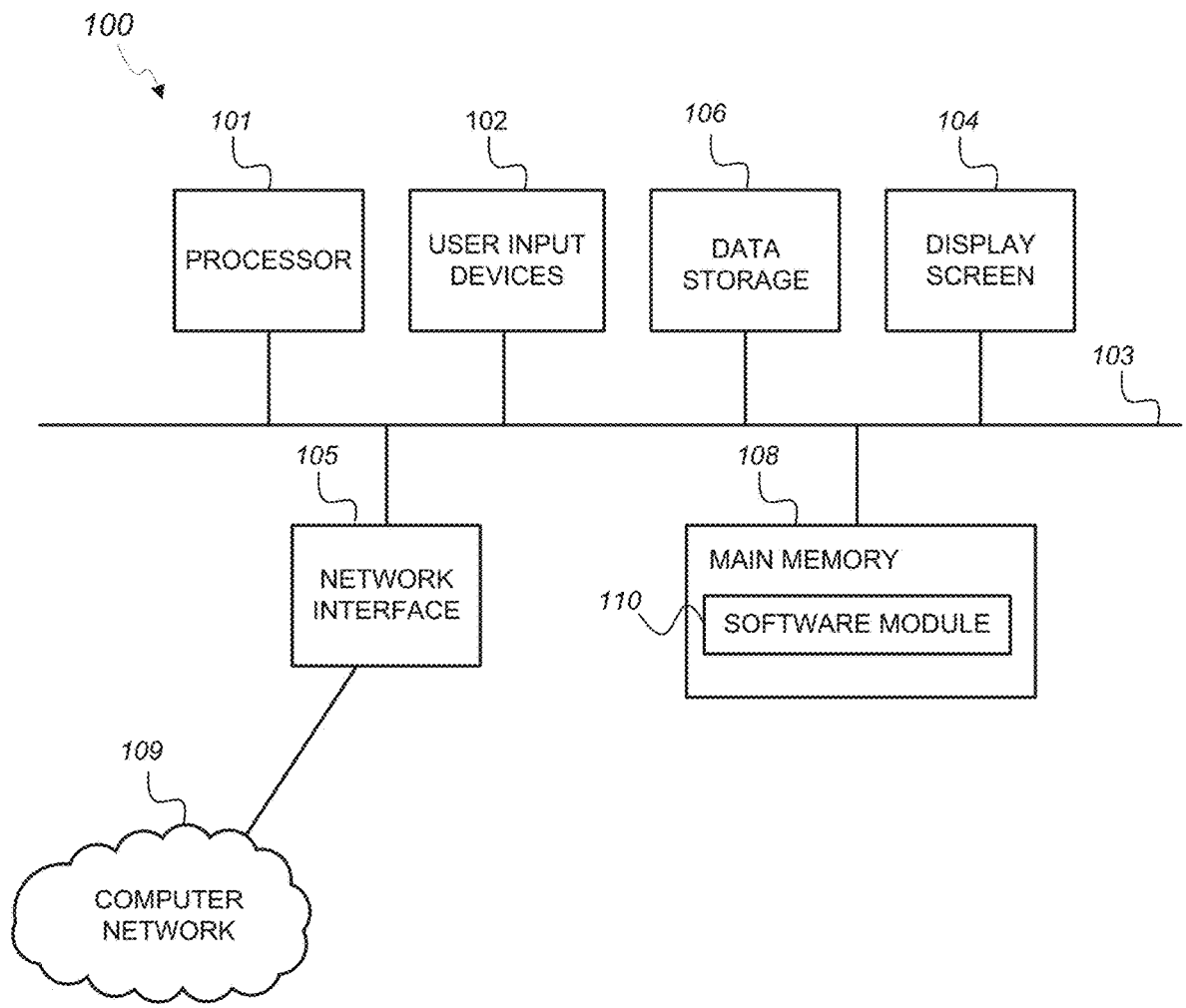
FIG. 10 shows a logical diagram of a computer system that may be employed with embodiments of the present invention.

Referring now to FIG. 10, there is shown a logical diagram of a computer system 100 that may be employed with embodiments of the present invention. The computer system 100 may be employed as a backend system or other computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In one embodiment where the computer system 100 is configured as a backend system, the software modules 110 comprise a risk detector.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting network entities that pose a cybersecurity risk to a private computer network, the method comprising:
   receiving information on a plurality of risk events that occurred involving a plurality of network entities of a private computer network, each of the plurality of risk events posing a cybersecurity risk to the private computer network, the plurality of network entities including users of the private computer network;
   representing each network entity of the plurality of network entities as a node of a plurality of nodes of a risk knowledge graph;
   connecting the plurality of nodes with edges, with each edge representing one or more risk events of the plurality of risk events that occurred involving nodes of the plurality of nodes that are connected by the edge;
   grouping the plurality of nodes into a plurality of communities, with each community of the plurality of communities including nodes of the plurality of nodes that are more related to each other relative to other nodes of the plurality of nodes included in other communities, wherein nodes in each community of the plurality of communities are interconnected within the community as in the risk knowledge graph; and
   performing a response action on a particular community of the plurality of communities to mitigate a cybersecurity risk posed by the particular community to the private computer network.

2. The method of claim 1, wherein the plurality of network entities includes a plurality of devices of the private computer network.

3. The method of claim 2, wherein the plurality of network entities includes an Internet Protocol (IP) address of a computer that connected to a device of the plurality of devices.

4. The method of claim 2, wherein the plurality of network entities includes a host name that is part of a link that a user of a device of the plurality of devices clicked.

5. The method of claim 1, wherein the information on the plurality of risk events is received from a Secure Access Service Edge (SASE) service.

6. The method of claim 1, further comprising:
   displaying the risk knowledge graph on a display screen.

7. The method of claim 6, displaying each node of the risk knowledge graph with a color that is indicative of a risk score of the node.

8. The method of claim 1, further comprising:
   generating a risk community graph by connecting the plurality of communities with edges that each represents one or more risk events of the plurality of risk events that occurred involving nodes of the plurality of nodes that are included in communities connected by the edge.

9. The method of claim 8, further comprising:
   displaying the risk community graph on a display screen.

10. The method of claim 1, wherein the response action includes alerting an administrator of the private computer network.

11. A computer system comprising at least one processor and a memory, the memory comprising instructions that when executed by the at least one processor cause the computer system to:
    receive information on a plurality of risk events that occurred involving a plurality of network entities of a private computer network, each of the plurality of risk events posing a cybersecurity risk to the private computer network, the plurality of network entities including users of the private computer network;
    represent each network entity of the plurality of network entities as a node of a risk knowledge graph;
    connect a plurality of nodes of the risk knowledge graph with edges, with each edge representing one or more risk events of the plurality of risk events that occurred involving nodes connected by the edge;
    group the plurality of nodes into a plurality of communities, wherein nodes in each community of the plurality of communities are interconnected within the community as in the risk knowledge graph; and
    perform a response action on a particular community of the plurality of communities to mitigate a cybersecurity risk posed by the particular community to the private computer network.

12. The computer system of claim 11, wherein the plurality of network entities includes devices of the private computer network.

13. The computer system of claim 11, further comprising:
    a display screen that displays the risk knowledge graph.

14. The computer system of claim 13, wherein each node of the risk knowledge graph is displayed on the display screen with a color that is indicative of a risk score of the node.

15. A method of detecting network entities that pose a cybersecurity risk to a private computer network, the method comprising:
    receiving information on a plurality of risk events that occurred involving a plurality of network entities of the private computer network, the plurality of network entities including users of the private computer network;
    representing each network entity of the plurality of network entities as a node of a risk knowledge graph;
    connecting nodes of the risk knowledge graph with edges that each represents one or more risk events of the plurality of risk events that occurred involving at least two network entities represented by nodes connected by the edge; and
    performing a response action against a particular network entity of the plurality of network entities identified in the risk knowledge graph to mitigate a cybersecurity risk posed by the particular network entity.

16. The method of claim 15, further comprising:
grouping the nodes into a plurality of communities, wherein nodes in each community of the plurality of communities are interconnected within the community as in the risk knowledge graph; and
performing a response action on a particular community of the plurality of communities to mitigate a cybersecurity risk posed by the particular community to the private computer network.

17. The method of claim 15, wherein the network entities include devices of the private computer network.

18. The method of claim 15, further comprising:
displaying the risk knowledge graph on a display screen.

19. The method of claim 18, wherein each node of the risk knowledge graph is displayed on the display screen with a color that is indicative of a risk score of the node.

20. The method of claim 18, further comprising:
grouping the nodes into a plurality of communities of a risk community graph, wherein nodes in each community of the plurality of communities are interconnected within the community as in the risk knowledge graph; and
displaying the risk community graph on the display screen, wherein the risk knowledge graph is displayed in response to a user clicking on a community of the displayed risk community graph.

* * * * *